Aug. 10, 1943. M. V. TRACY 2,326,416
GAUGE FOR POWER SAWS
Filed Jan. 21, 1941 2 Sheets-Sheet 1
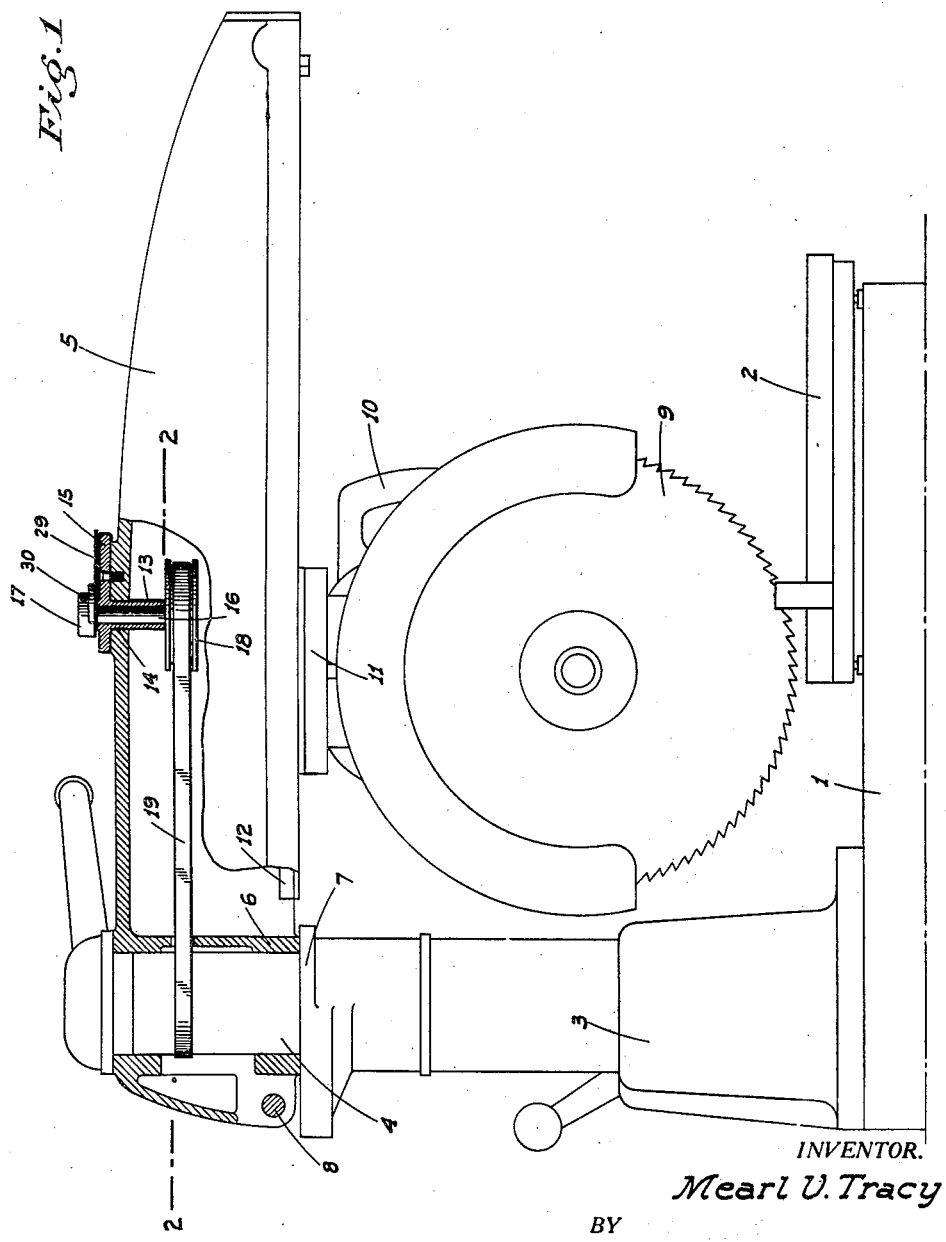
INVENTOR.
Mearl V. Tracy
BY
ATTORNEYS Aug. 10, 1943.  M. V. TRACY  2,326,416
GAUGE FOR POWER SAWS
Filed Jan. 21, 1941   2 Sheets-Sheet 2
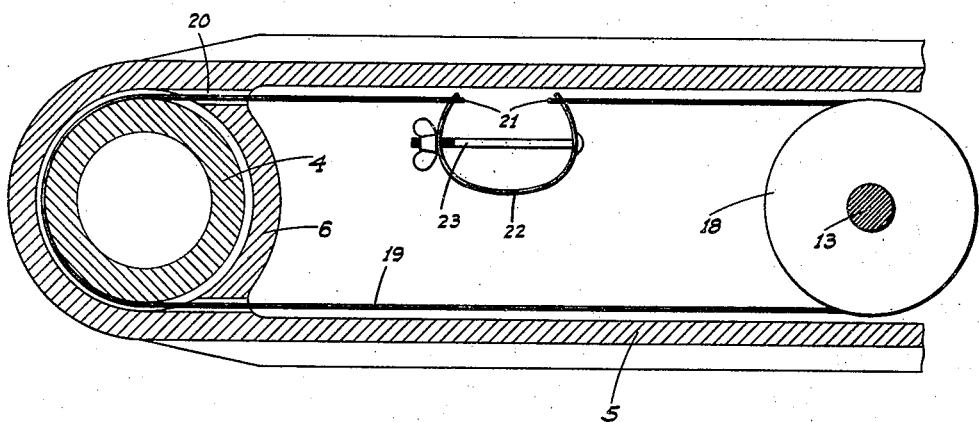
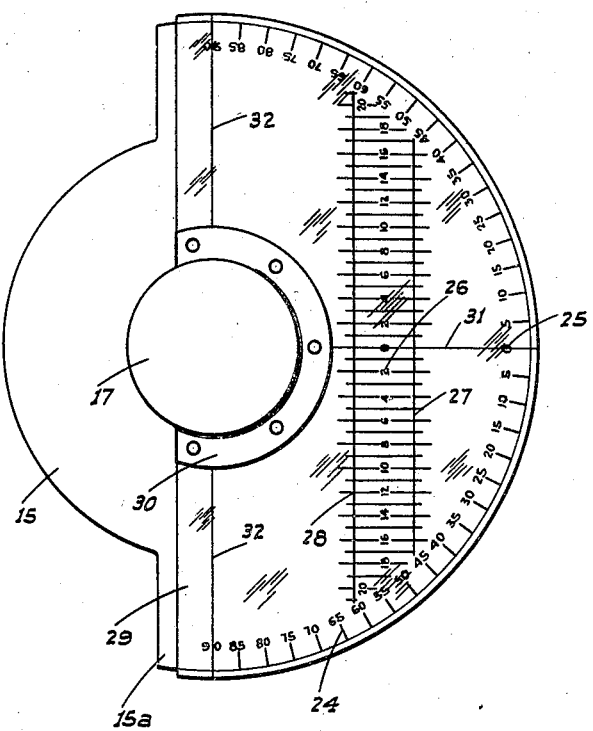
INVENTOR.
Mearl V. Tracy
BY
*Webster & Webster*
ATTORNEYS Patented Aug. 10, 1943

2,326,416

UNITED STATES PATENT OFFICE 2,326,416

GAUGE FOR POWER SAWS

Mearl V. Tracy, Pasadena, Calif., assignor to Tracy Tool Co., Pasadena, Calif., a copartnership comprising Mearl V. Tracy and Marian M. Tracy Application January 21, 1941, Serial No. 375,186

2 Claims. (Cl. 143—6)

This invention relates in general to gauging apparatus for wood-working machines, and in particular the invention is directed to—and it is my principal object to provide—an angle of cut indicating gauge designed for embodiment in power saws. This invention is especially designed for use with power saws of the type wherein the drive motor and a direct connected saw are suspended from a carriage which travels along a horizontal and radially swingable arm mounted on and projecting from a vertical column or post; the saw being manually pulled across the work to be cut. Such apparatus is known in the trade as a radial saw and this invention has been designed primarily for use with radial saws as manufactured by the De Walt Products Corporation of Lancaster, Pennsylvania.

It is also an object of the invention to provide an angle of cut indicating gauge which is automatic in operation, direct reading, and reads both in degrees as well as in inches of rise.

A further object of the invention is to provide an angle of cut gauge which is arranged so that it may readily be applied to radial saws as an accessory, or can be easily incorporated at the time of manufacture; either without any material reconstruction of the machine.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation, partly in section, of a radial saw with the present invention embodied therein.

Figure 2 is an enlarged fragmentary section on line 2—2 of Fig. 1.

Figure 3 is a plan view of the gauge plate and cooperating pointer dial separate from the device.

Referring now more particularly to the characters of reference on the drawings, the radial saw on which the gauge is here mounted is of well-known design and includes a table 1 provided with a work supporting table top 2. A base 3 is mounted on the table to one side of top 2, and a vertical post or column 4 is seated in and rigidly supported by such base.

A radial arm 5 having a sleeve 6 surrounding post 4 adjacent its upper end and resting on a collar or base flange 7, projects horizontally from said post in overlying relation to table top 2; the sleeve 6 being rotatable relative to post 4 but normally held against rotation by a manually releasable clamping bolt 8 or similar arrangement.

A saw and motor assembly indicated generally at 9, and fitted with a handle 10, is suspended from a carriage 11 which includes means (not shown) slidably engaging in a longitudinal channel in the bottom of arm 5 and riding opposed tracks 12 whereby the saw may be manually drawn across the table top 2 and cut through work supported thereon.

The angle of cut gauge comprises the following structure:

The arm 5 is hollow beyond sleeve 6, and intermediate the ends of said arm a vertical bearing sleeve 13 depends into the interior thereof through a top opening or bore 14; such sleeve being formed integral with and supported by a flat plate 15 secured on the top of the arm 5.

A shaft 16 is rotatably disposed in bearing sleeve 13; a head 17 is fixed on the upper end of the shaft above the plate 15, while a horizontal, flat faced pulley 18 is fixed on the lower end of said shaft beyond the sleeve. An endless unit extends between the portion of post 4 in sleeve 6 and pulley 18; such unit including a metal strap 19 which frictionally engages about the pulley as well as said portion of the post, the sleeve 6 being formed with openings 20 through which the strap passes. Adjacent ends 21 of the straps are disposed in spaced relation between the post and pulley, and are connected by a C-shaped tensioning member 22 which is fitted with an adjustable tension bolt 23 extending between opposite sides of said member and parallel to the reaches of the strap.

The plate 15 is formed with an enlarged semicircular gauge plate portion 15a disposed mainly ahead of the axis of shaft 16, and with its rear edge at right angles to the longitudinal axis of arm 5. The top of semi-circular gauge plate 15a is scaled in degrees adjacent its periphery as at 24; the scale reading 90° on both sides of a zero point 25 which is disposed on a line radially and centrally of the top arm 5; the scale as a whole being drawn about pulley shaft 16 as an axis. Inwardly of scale 24, plate 15a is scaled as at 26 on spaced parallel lines 27 and 28 which are at right angles to arm 5; this scaling likewise reading from a zero point in the same line as point 25, but here is scaled in inches of rise; the scales 26 reading on line 27 for hips and valleys, and reading on line 28 for jacks and commons.

A transparent dial 29, of substantially the same size and configuration as gauge plate 15a is disposed in closely spaced relation thereabove, and is mounted in fixed relation with head 17 by means of a flange 30 formed on and projecting from said head. Pointer lines are scribed on dial 29 radially of pulley shaft 16 and 90° apart; the central line being indicated at 31 and reading directly on zero of both scales on plate 15a when arm 5 is exactly at right angles to the table top 2, and the other pointer lines indicated at 32 and then reading on 90° on opposite sides of the gauge plate.

In use, when the arm 5 is adjusted horizontally in one direction or the other to an angled position and for the purpose of making an angle cut, relative rotation is imparted to the pulley and the dial 29 rotates relative to gauge plate 15a. The parts of the gauging device are designed to impart such movement of the dial relative to the scales on the gauge plate 15a to accurately and correspondingly define the extent of horizontal movement and angle of arm 5. In other words, when the arm is moved to a certain angle, line 32 read on scale 24 will give an exact reading of the angle of cut of the saw in degrees; or if read on lines 27 and 28, the cut as expressed in inches of rise.

When one cut has been determined from line 31, corresponding 90° cuts may be determined from lines 32.

It will be noted that as shown, the relative movement of pulley 18 is governed by the frictional engagement of strap 19 with post 4, but said strap may be rigidly secured on the post if desired.

As will be obvious, an operator of the machine by reading the conveniently located dial and gauge assembly is able to accurately set the saw for a cut at any desired angle as represented by either degrees or inches of rise.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a radial saw which includes an upstanding post, and a hollow saw-supporting arm turnable on and projecting radially from the post, the post having a circular portion within the arm; a gauge plate fixed horizontally on top of the arm intermediate its ends, a pointer-shaft turnable in the plate and depending into the hollow interior of the arm, said shaft being parallel to the post, a pulley on the shaft within the head and a tensioned belt engaging and extending between said circular portion of the post and the pulley.

2. In a radial saw which includes an upstanding post, and a hollow saw-supporting arm turnable on and projecting radially from the post; a gauge plate on the outside of the arm, a pointer reading against the plate, a turnable shaft on which the pointer is fixed projecting into the hollow interior of the arm, the post having a circular portion within the arm, and a tensioned belt within the arm engaging and extending between said circular portion of the post and the shaft.

MEARL V. TRACY.